(12) United States Patent
Hartvigsen et al.

(10) Patent No.: US 9,011,788 B2
(45) Date of Patent: Apr. 21, 2015

(54) ADVANCED FISCHER TROPSCH SYSTEM

(71) Applicant: Ceramatec, Inc., Salt Lake City, UT (US)

(72) Inventors: Joseph J. Hartvigsen, Kaysville, UT (US); S. Elangovan, South Jordan, UT (US); Lyman Joseph Frost, Idaho Falls, ID (US)

(73) Assignee: Ceramatec, Inc, Salt Lake City, UT (US)

( * ) Notice: Subject to any disclaimer, the term of this patent is extended or adjusted under 35 U.S.C. 154(b) by 23 days.

(21) Appl. No.: 13/767,604

(22) Filed: Feb. 14, 2013

(65) Prior Publication Data

US 2013/0216444 A1    Aug. 22, 2013

Related U.S. Application Data

(60) Provisional application No. 61/600,501, filed on Feb. 17, 2012.

(51) Int. Cl.
 B01J 8/06 (2006.01)
 F28F 1/40 (2006.01)
 C10G 2/00 (2006.01)

(52) U.S. Cl.
 CPC . *F28F 1/40* (2013.01); *B01J 8/067* (2013.01); *C10G 2/31* (2013.01); *B01J 2208/00513* (2013.01); *B01J 2208/0084* (2013.01); *B01J 2208/026* (2013.01)

(58) Field of Classification Search
 CPC .................................. F28F 1/40; B01J 8/067
 USPC .................. 422/650–653, 198, 201
 See application file for complete search history.

(56) References Cited

U.S. PATENT DOCUMENTS

| 1,283,865 | A | * | 11/1918 | Behr | 92/212 |
| 2,895,508 | A | * | 7/1959 | Drake | 138/38 |
| 3,147,084 | A | * | 9/1964 | Franzen et al. | 422/652 |
| 3,857,680 | A | | 12/1974 | Porta et al. | |
| 8,069,678 | B1 | * | 12/2011 | Bernert | 62/50.2 |

(Continued)

FOREIGN PATENT DOCUMENTS

| KR | 10-0901736 | 6/2009 |
| KR | 10-2011-0037640 | 4/2011 |
| WO | WO-2010130399 | 11/2010 |

OTHER PUBLICATIONS

Kim, Dong S., "International Search Report", PCT/US2013/026203, (Jun. 13, 2013),1-3.

(Continued)

*Primary Examiner* — Walter D Griffin
*Assistant Examiner* — Huy-Tram Nguyen
(74) *Attorney, Agent, or Firm* — David Fonda

(57) ABSTRACT

A Fischer Tropsch ("FT") unit that includes an FT tube that is packed with a catalyst. The catalyst is designed to catalyze an FT reaction to produce a hydrocarbon. An insert that is positioned within the FT tube. The insert comprises at least one cross-piece that contacts an inner surface of the FT tube and at least one cross-fin extending from the cross-piece. There may be a corresponding second cross-fin adjacent each cross-fin. Both the cross-fins and the second cross-fins may be disposed radially outwardly such that the edge of the cross-fins are closer to the inner surface of the FT tube than is the base of the cross-fins.

22 Claims, 8 Drawing Sheets

(56) References Cited

U.S. PATENT DOCUMENTS

| | | | |
|---|---|---|---|
| 2002/0048541 A1 | 4/2002 | Schodel et al. | |
| 2003/0175173 A1* | 9/2003 | Karlsson et al. | 422/130 |
| 2003/0180201 A1 | 9/2003 | Belt et al. | |
| 2004/0192989 A1 | 9/2004 | Espinoza et al. | |
| 2005/0080147 A1 | 4/2005 | Hawthorne et al. | |
| 2007/0003460 A1* | 1/2007 | Matsumoto et al. | 422/219 |
| 2007/0036697 A1 | 2/2007 | Gutlhuber et al. | |
| 2007/0299148 A1* | 12/2007 | Verbist | 518/712 |
| 2009/0038155 A1 | 2/2009 | Corry | |
| 2009/0215911 A1 | 8/2009 | Wang et al. | |
| 2009/0220389 A1 | 9/2009 | Onishi et al. | |
| 2009/0269258 A1* | 10/2009 | Yi et al. | 422/196 |
| 2010/0160463 A1 | 6/2010 | Wang et al. | |
| 2010/0303683 A1 | 12/2010 | Hendrie et al. | |
| 2010/0324158 A1 | 12/2010 | Bowe et al. | |
| 2011/0160318 A1 | 6/2011 | Bos et al. | |

OTHER PUBLICATIONS

Kim, Dong S., "Written Opinion of the International Searching Authority", PCT/US2013/026203, (Jun. 13, 2013),1-4.

Kim, Dong S., "International Search Report", PCT/US2013/026939, (Jun. 29, 2013),1-3.

Kim, Dong S., "Written Opinion of the International Searching Authority", PCT/US2013/026939, (Jun. 29, 2013),1-4.

Kim, Dong S., "International Search Report", PCT/US2013/026721, (Jun. 3, 2013),1-4.

Kim, Dong S., "Written Opinion of the International Searching Authority", PCT/US2013/026721, (Jun. 3, 2013),1-6.

Lee, et al., "Bibliography and English Abstract", KR 10-0901736, (Jun. 9, 2009),1-2.

Lee, et al., "Bibliography and English Abstract", KR 10-2011-0037640, (Apr. 13, 2011),1-2.

Guettel, Robert et al., "Reactors for Fischer-Tropsch Synthesis", *Chemical Engineering & Technology*, 2008, vol. 31, Issue 5, (Apr. 22, 2008),746-754.

\* cited by examiner

ADVANCED FISCHER TROPSCH SYSTEM

RELATED APPLICATIONS

This application claims the benefit of U.S. Provisional Patent Application Ser. No. 61/600,501 filed Feb. 17, 2012. This prior provisional application is expressly incorporated herein by reference.

TECHNICAL FIELD

The present disclosure relates to devices and methods for more efficiently performing Fischer Tropsch ("FT") processing of a syngas stream. More specifically, the present disclosure relates to a device and method for FT processing with improved catalyst and temperature control for more efficient results.

BACKGROUND

The Fischer Tropsch ("FT") process, which is sometimes called FT synthesis, is a chemical reaction used routinely in oil and gas processing. This process involves the conversion of carbon monoxide and hydrogen gas into a hydrocarbon chain and water. This reaction may be summarized as follows:

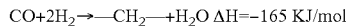

$$CO + 2H_2 \rightarrow -CH_2- + H_2O \quad \Delta H = -165 \text{ KJ/mol}$$

Generally, a catalyst is used in this reaction. This FT process usually occurs at high temperatures and high pressures, such as, for example, at pressures of 150-300 psig and temperatures ranging from 200-300° C. (The input stream that is input into the FT reaction vessel is often called synthesis gas or "syngas"). FT technology provides a method for conversion of carbon and hydrogen containing streams from one form (e.g. standard natural gas, biomass, or a mixture of carbon and hydrogen containing materials in gas, liquid, or solid forms) to another form (e.g. kerosene & diesel fuel). In general, the initial mixture of carbon and hydrogen containing material is converted to syngas prior to the introduction into an FT reactor, although the conversion itself could occur over a catalyst in the FT reactor.

The FT process will generally produce a mixture of liquid and gaseous hydrocarbons ($-CH_2-$ molecules). In general, the liquid hydrocarbons (such as octane, hexane, and others hydrocarbons with carbon numbers greater than 5) tend to be more valuable than the gaseous products (such as methane, ethane, etc.) because these liquid products may be used in producing kerosene, diesel fuel and other desirable products.

The FT process is highly exothermic (with a $\Delta H = -165$ KJ/mol). If the produced heat is not removed as part of the reaction conditions, the metallic catalyst can be damaged and the products generated will tend to be gases rather than the more valuable liquids and gases. Further, care must be taken to insure that sulfur-containing compounds are not part of the syngas as these chemicals tend to poison the catalysts, thereby causing the reaction to fail.

Accordingly, there is a need in the art for a new device and method for FT processing that is more efficient and will better remove the heat produced during the reaction, thereby ensuring that the more valuable liquids are produced during the process. Such a device and method is disclosed herein.

SUMMARY

An extruded aluminum (or other high heat conductive metal) fin is placed within a tubular Fischer Tropsch (FT) reactor. It is important that the catalyst bed in an FT reactor be maintained at an even temperature to maximize the production of the liquid (i.e., higher value) output from the FT reactor. The conduction of heat away from the center of the reactor catalyst bed will assist in maintaining an even temperature and allow control of the temperature within the desired range.

To maintain the even bed temperature, a high heat conductive metal finned extrusion is included within the tubular fixed bed FT reactor. The extrusion would conduct heat from the reactor catalyst bed to the reactor walls and insure an improved temperature profile within the catalyst bed. The improved heat removal ability derived by including the fin within the catalyst bed also enables using much larger diameter reactors, thus reducing cost and increasing capacity. One embodiment of the finned extrusion involves a "snowflake" patterned extrusion within the tubular FT reactors embedded in a cooling block.

DETAILED DESCRIPTION

The present embodiments of the present invention will be best understood by reference to the drawings, wherein like parts are designated by like numerals throughout. It will be readily understood that the components of the present invention, as generally described and illustrated in the Figures herein, could be arranged and designed in a wide variety of different configurations. Thus, the following more detailed description of the embodiments of the methods and cells of the present invention, as represented in the Figures, is not intended to limit the scope of the invention, as claimed, but is merely representative of present embodiments of the invention.

Fischer Tropsch (FT) processing is a method for the production of various hydrocarbons from the input of synthesis gas. It is a surface catalyzed carbon polymerization process that largely produces straight chain hydrocarbons that range from $C_1$ to greater than $C_{100}$ hydrocarbon products. The hydrocarbon products generally follow a distribution called the ASF (Anderson-Schultz-Flory) distribution defined by the chain growth probability factor ("α") that is a strong function of temperature. Maintaining the catalyst bed at an even temperature is important since higher bed temperatures tend to favor the formation of more of the gaseous (i.e. lower value) products while lower temperatures tend to favor production of waxes that are not easily transported by pipeline or directly usable as fuel. In other words, one of the purposes of this invention is to create a large tubular, fixed bed FT reactor and controlling the temperature of the catalyst bed within the reactor to prevent catalyst damage and improve yields in the liquid and wax range of FT products.

The ASF chain growth probability factor ($\alpha$) decreases by about 0.004/° C. increase in catalyst temperature. This means that a 15° C. variation in local temperature would mean a 0.06 shift in alpha which has a major impact on the product distribution. For example if the optimal alpha value for a desired liquid product was about 0.85, portions of the reactor 15° C. cooler would have an alpha of 0.91 and make too much wax while portions of the reactor 15° C. hotter would make less liquid and too much gas as product. Accordingly, it is desirable to find systems that will control the temperature along the entire length and in radial direction of the FT reactor, and thus, the alpha value, to provide consistent results.

Figure 1:
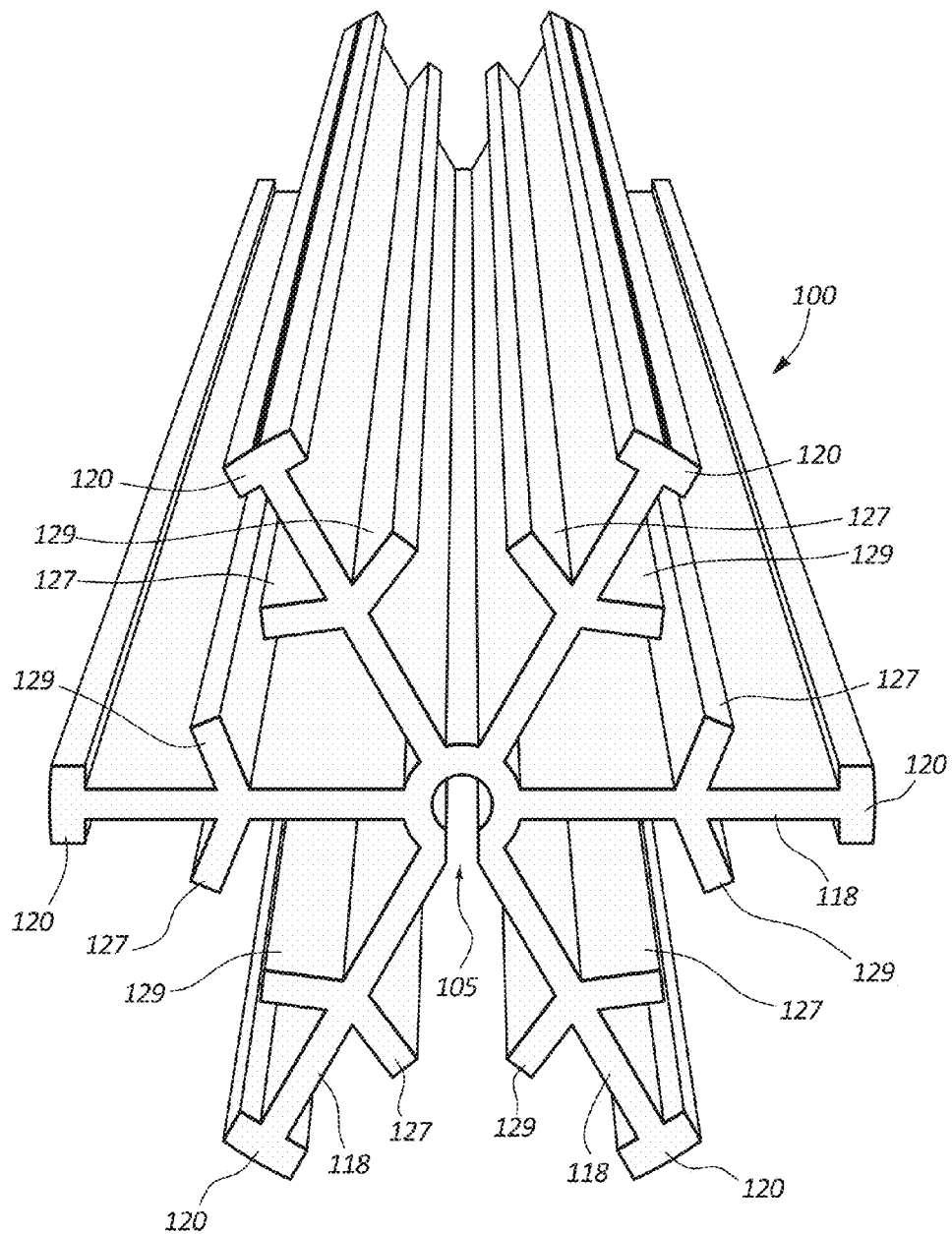
FIG. 1 shows a perspective view of an insert that may be added to an FT reactor tube.
Figure 2:
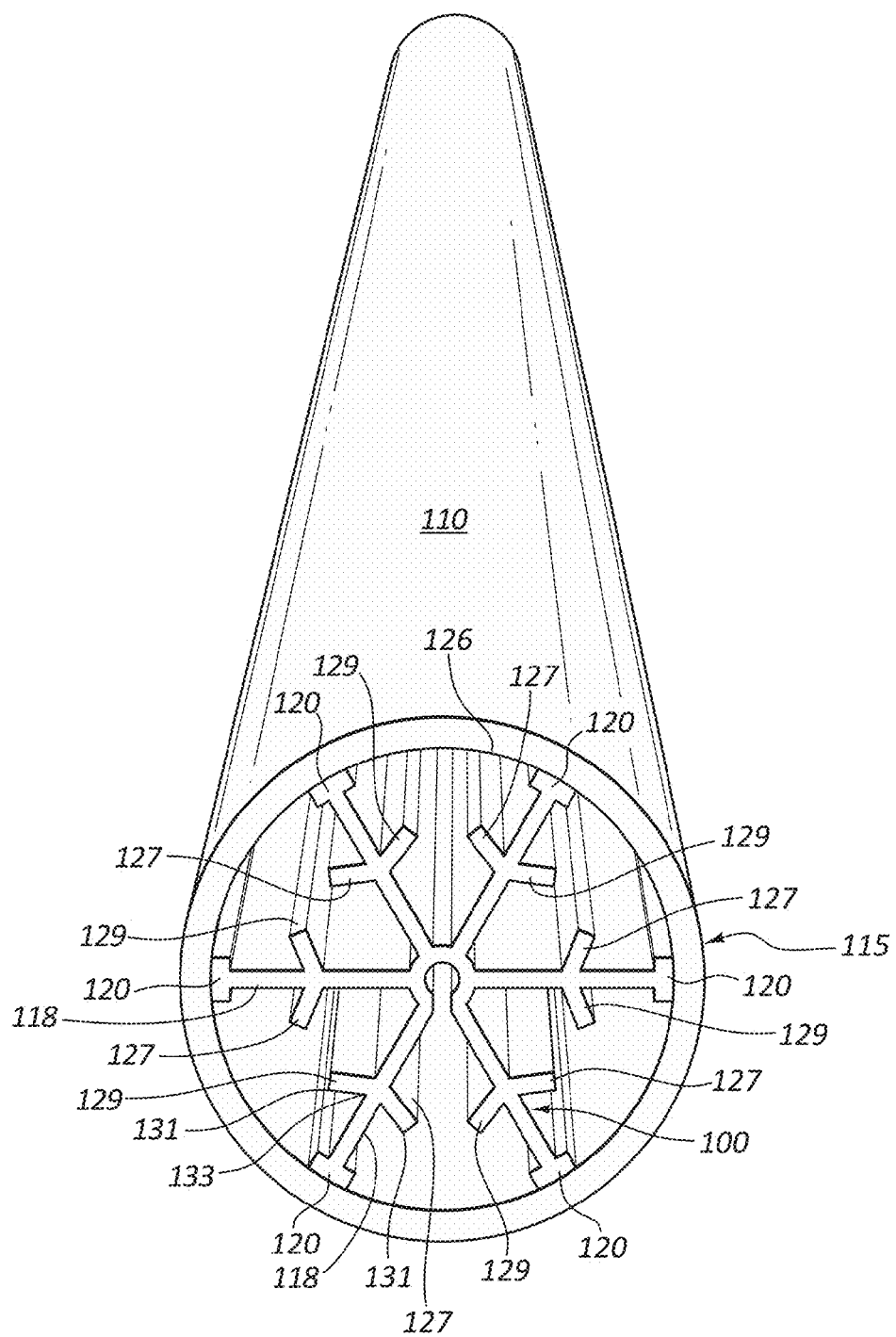
FIG. 2 shows a perspective of the insert of FIG. 1 being added to an FT reactor tube.

To maintain the even bed temperature, a high heat conductive metal finned extrusion is constructed that may fit within the tubular fixed bed FT reactor. The extrusion would conduct heat from the reactor catalyst bed to the reactor walls and insure an improved temperature profile within the catalyst bed. The improved heat removal ability derived by including the fin within the catalyst bed also enables using much larger diameter reactors, thus reducing cost and increasing capacity. FIG. 1 shows one embodiment an insert 100 and FIG. 2 shows the insert 100 added to an FT reactor tube 110. This insert 100 will now be described in conjunction with FIGS. 1 and 2. Taken together, the insert 100 and the FT reactor tube 110 form an FT unit 115.

In some embodiments, a bank (group) of FT reactor tubes 110 may be included in an FT unit 115. For example, there may be approximately twelve (12) tubes in four (4) banks of three (3) tubes up to 38 mm in inner diameter. Systems having larger diameter tubes, and greater numbers of tube banks and tubes per bank are anticipated. This size was selected only as being convenient for laboratory scale fabrication and testing.

The insert 100 is designed such that a thermocouple opening 105 is positioned at the center of the insert 100. This opening 105 may be designed such that a thermocouple (not shown in FIG. 1) may be used to measure the temperature proximate the insert 100. A multijunction thermocouple may be used to measure the temperature at various locations along the length of the insert 100. The opening 105 may also assist in the extrusion process that is used to make the insert 100.

The insert 100 will generally be made of aluminum or another metal. The insert 100 may generally have a "snowflake" pattern/configuration. In order to create this shape, the insert 100 will have at least one cross-piece 118. This cross-piece 118 is a metal piece that extends across or partially across the diameter of the FT tube 110. In the embodiment shown in FIGS. 1-2, there are three (3) different cross-pieces 118 that aligned so as to have dihedral symmetry. In other words, the three cross-pieces 118 spaced so that they create a shape similar to that of a regular hexagon. Of course, other embodiments may be designed in which a different number of cross-pieces 118 are used.

Each cross-piece 118 generally comprises a pad 120. The pad 120 is an extruded portion of the insert 100 that is designed to abut/engage the inner surface 126 of the FT reactor tube 110. The pad 120 may be perpendicular to the length of the cross-piece 118. Accordingly, when heat is produced during the FT reaction within the reactor tube 110, the heat may flow radially (outwardly) along the cross-pieces 118 until it reaches the pads 120. Once the heat is at the pads 120, the pads 120 will transfer the heat to the inner surface 126 of the FT reactor tube 110. Once the heat is transferred from the inside of the FT reactor tube 110 (through the insert 100) to the inner surface 126 of the FT reactor tube 110, this heat may be dissipated away from the tube 110 by passing to the outer surface of the tube 110 and then exiting the tube 110 into the surrounding matrix/media. In this manner, the heat created by the FT reaction within the FT reactor tube 110 may be dealt with (taken away by, for example, a cooling fluid, a cooling block, etc.), thereby maintaining the FT reactor tube 110 at a constant or nearly constant temperature (and thereby allowing the FT reactor tube 110 to produce more consistent results from the FT reaction).

In the embodiment shown in FIGS. 1-2, each cross-piece 118 contacts the inner surface 126 via the pad 120. However, other embodiments may be designed in which one or more pads 120 are omitted. In these embodiments, the cross-piece may directly contact the inner surface 126 (e.g., contact the inner surface 126 in some other way than through a pad 120).

Further, the insert 100 may further comprise at least one cross-fin 127. The cross-fin 127 is an extension that extends from the cross-piece 118 at or near the center point between each pad 120 and the opening 105. In the embodiment shown in FIGS. 1-2, each cross-fin 127 is paired with a corresponding second cross-fin 129. Each second cross-fin 129 may be similar and/or identical to the cross-fins 127, except that the cross-fins 127 extend away from the cross-pieces 118 in a first direction while the second cross-fins 129 extend away from the cross-pieces 118 in a second direction, the second direction being different than the first direction. As shown in FIGS. 1-2, each cross-piece 118 includes one first cross-fin 127 and one second cross-fins 129. It will be appreciated by those of skill in the art that there may be multiple cross-fins along a single cross-piece 118. Additionally, the cross-fins may be different lengths. For example, as the cross-piece 118 extends radially outward, the cross-fins may become longer. This will allow the cross-fins to penetrate more into the catalysis volume as the cross-piece gets nearer the pad 120.

In the embodiment shown in FIGS. 1-2, both the cross-fins 127 and the second cross-fins 129 are disposed towards the inner surface 126. This means that the cross-fins 127, 129 extend radially outwardly such that the edge 131 of the cross-fins 127, 129 are closer to the inner surface 126 than in the base 133 of the cross-fins 127, 129. Of course, other embodiments may have the cross-fins 127, 129 be perpendicular to the cross-pieces 118. Still further embodiments may be designed in which the cross-fins 127, 127 are disposed away from the inner surface 126 such that the cross-fins 127, 129 extend radially inwardly (toward the opening 105), thereby ensuring the that base 131 of the cross-fins 127, 129 are closer to the inner surface 126 than in the edge 131.

The purpose of the cross-fins 127, 129 is to help to dissipate the heat that is formed during the FT reaction. Specifically, if the heat is formed in the interior of the FT reactor tube 110 such as, for example, between the pad 120 and the opening 105, then this heat can come into contact with one or more of the cross-fins 127, 129. The cross-fins 127, 129 can help to transfer the heat to the cross-pieces 118, which will then transfer the heat to the pads 120, the inner surface 126 and outside of the FT reactor tube 110. Thus, by providing the cross-fins 127, 129, there is a greater surface area and likelihood that the heat created by the FT reaction on the interior of the FT reactor tube 110 will contact a portion of the insert 100.

Figure 3:
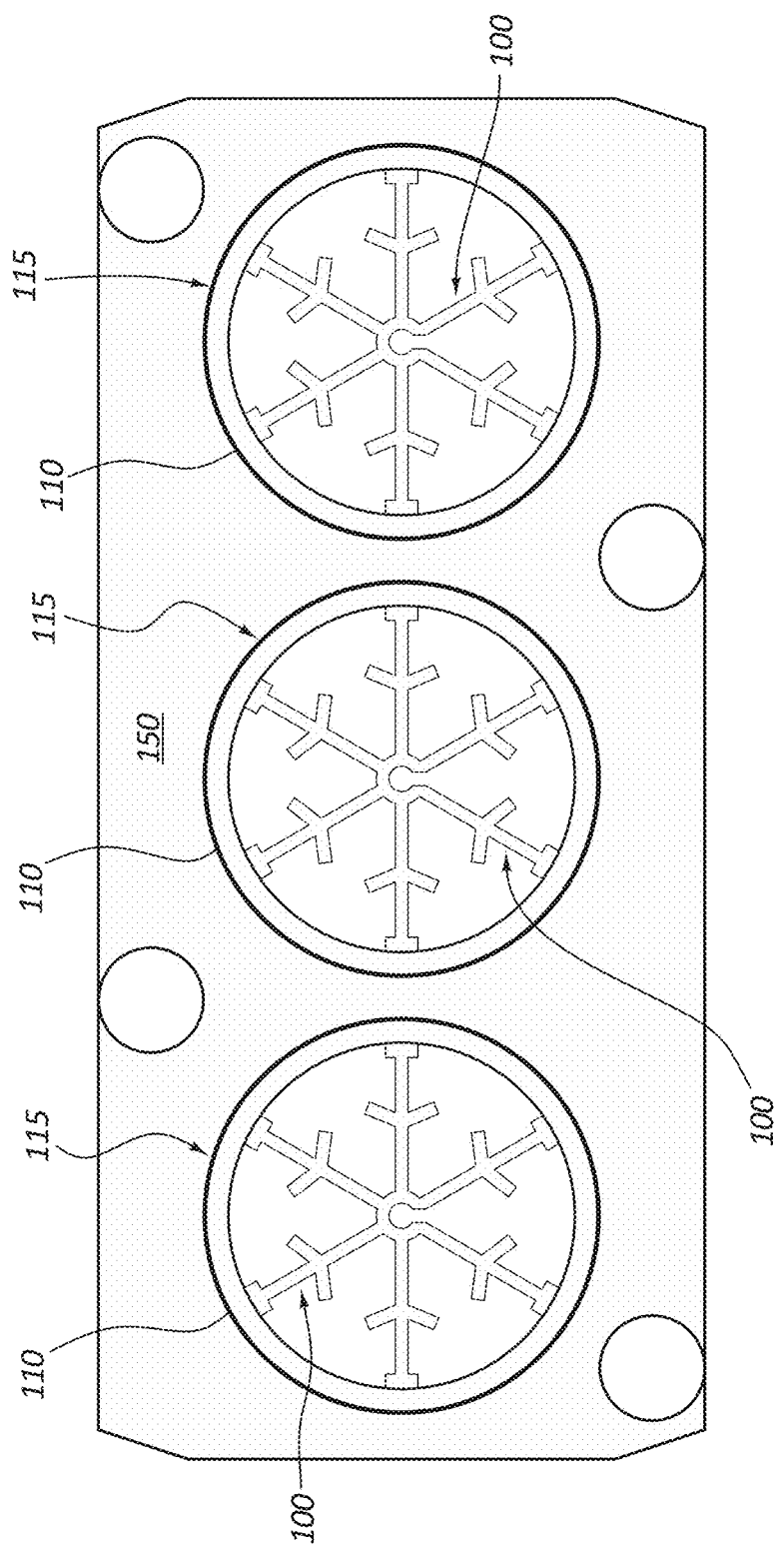
FIG. 3 shows a perspective view of the insert and FT reactor tube of FIG. 2 used in conjunction with a cooling block.

Referring now to FIG. 3, the FT unit 115 of FIGS. 1-2 is shown used in conjunction with a cooling block 150. The FT reactor tubes 110 may be placed in a cooling block 150 so that some of the heat generated from the FT reaction may be absorbed by the cooling block 150 (e.g., as a way to dissipate/ absorb heat). The cooling block 150 may also house cooling tubes (not shown) that channel cooling fluid (such as water or oil) proximate the FT reactor tubes 110 such that the cooling tubes will further absorb/dissipate the generated heat. In the embodiment shown in FIG. 3, the FT unit 115 is shown used in conjunction with a cooling block as described in U.S. Provisional Patent Application No. 61/601,103 (whose content is incorporated herein by reference). Likewise, the FT reactor unit 115/insert 100 may also be used in conjunction with the cooling apparatus disclosed in U.S. Provisional Patent Application No. 61/601,134 (whose content is also incorporated herein by reference). Of course, other types of cooling blocks/cooling mechanisms may be used in conjunction with the insert/FT reactor unit 115. Those skilled in the art will appreciate how to combine the disclosures of these applications with the present embodiments. For example, the present insert 100 inside a tube may be placed within a cooling block of the type described in the above-recited provisional patent application or may be used within the primary/secondary temperature bed control system found in U.S. Provisional Patent Application No. 61/601,134. Further, the catalyst within the FT tube may be of the type shown in U.S. Provisional Patent Application Ser. No. 61/601,103 filed Feb. 21, 2012.

It should be noted that the exact configuration and location of the cross-fins 127, 129 and the cross-pieces 118 may depend upon a mathematical relationship. Specifically, the number of cross-fins 127, 129, the length of the cross-fins, the position of the cross-fins, and the thickness of cross-fins at both the base and the tip are so that a ratio X equals 1.7, wherein the X ratio is:
Heat generation rate at the hottest point within the FT tube/heat generation rate at the inner wall of the FT tube.
The ratio X of 1.7 is given as an example of the largest ratio of hot to cold zone temperature (as adjusted to reaction rate). In other embodiments, the value of this ratio might be as low as 1.2 or as great as 4.

Figure 4:
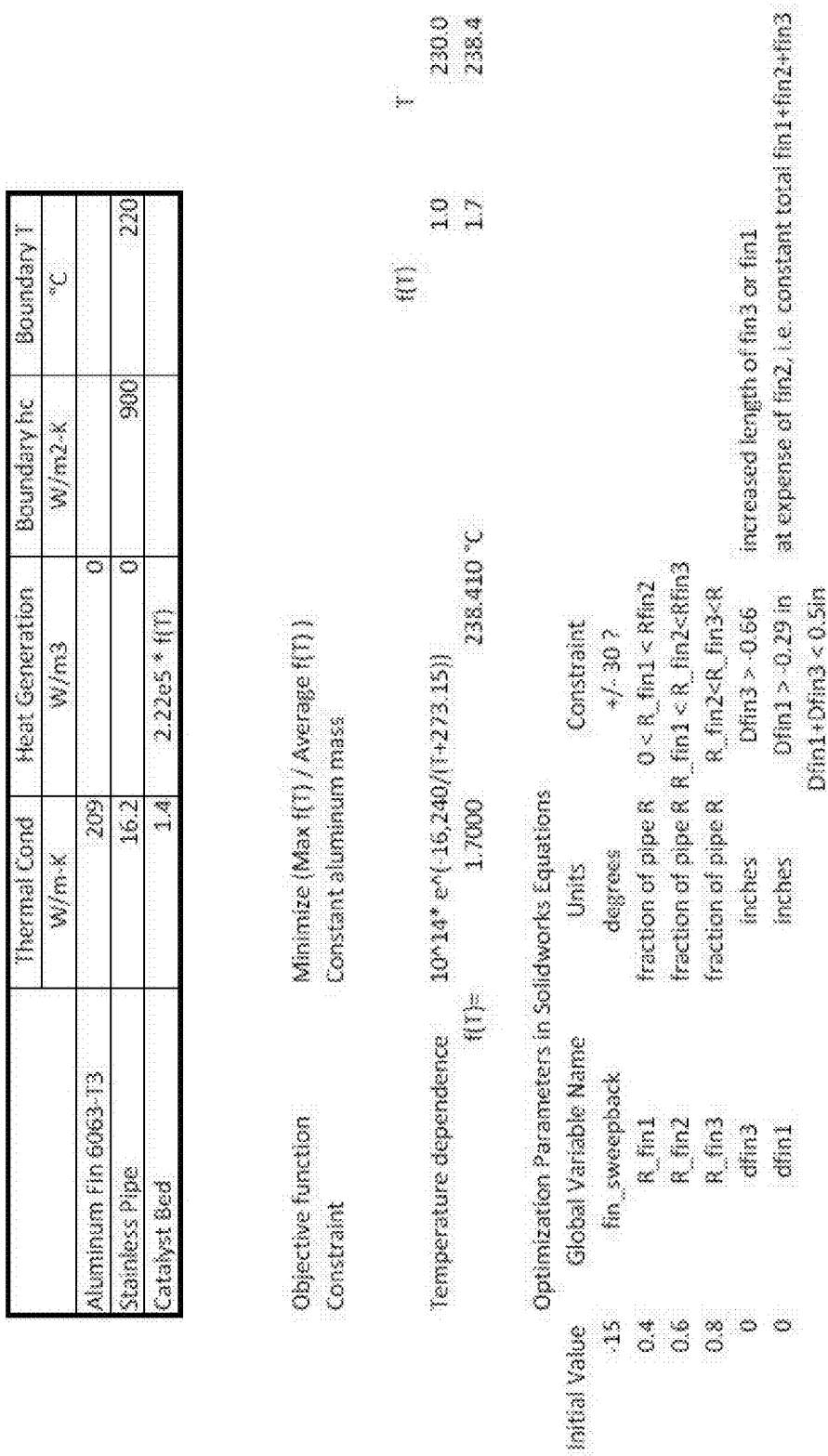
FIG. 4 shows a mathematical representation of how the shape and configuration of the fins on the insert are selected.

More specifically, the depiction of FIG. 4 shows an example rate equation where the temperature dependence function f(T)=1.0 for T=230° C., which may be used to determine the position/configuration of the cross-fins. In this example showing how the shape/configuration of the cross-fins are optimized, the position, length and angle of the fins as well as thickness of the fins are all varied in order to optimize the reactor productivity with a constraint that the maximum value for f(T) anywhere in the domain is 1.7, which occurs for T=238.4° C.

This ratio 1.7/1.0 (in which the function f(T) is constructed to equal 1 at 230° C.) is in effect a constraint on maximum temperature. The objective function in the optimization is to maximize the integral of f(T) over the reactor volume (or cross sectional area in 2D) with the constraint on the maximum value of f(T) anywhere in the volume. In this case saying that the maximum value of f(T) is 1.7 works out to saying we want everything in the 230-238.4° C. range with the area or volume average being as high as possible without violating the constraint. Adding more fin metal helps keep from violating the constraint, but it also reduces the volume available for catalyst which is part of the equation.

In this example, the starting point is to consider an the inside diameter (of the FT reactor pipe) to be 4 inches and then, the model puts as little fin volume as possible that will still satisfy the constraint. (Of course, this modeling may be done with a computer and/or computer-implemented software.) Strictly speaking it is not minimizing the amount of fin volume as more fin volume in strategic areas can help maximize the objective function.

It should be noted that the cross-fins 127, 129 that are shown in FIGS. 1-4 are all "straight" in that they extend linearly from the cross-pieces. This depiction is not limiting. Those skilled in the art will appreciate that the cross-fins 127, 129 may be "curved," "parabolic" in shape, "bent," or otherwise configured. Likewise, those skilled in the art will appreciate that the cross-pieces 118 may also be "curved," bent, etc.

It should be noted that the catalyst that is used within the FT tube 110 may be a metallic, microfibrous entrapped catalyst ("MFEC") for the FT catalyst. These types of catalysts are described in U.S. Provisional Patent Application Ser. No. 61/601,103 filed Feb. 21, 2012, which application is incorporated herein by reference. The MFEC reactor charge has a much higher thermal conductivity that enables the transfer of heat from the interior of the catalyst bed to the reactor wall. Laboratory measurements have indicated that the MFEC transfers approximately 50 times as much heat as a traditional packed bed catalyst approach. The MFEC has the additional benefit of promoting interaction between the FT catalyst and the input synthesis gas feedstock. The high heat transfer controls the radial heat distribution in the reactor.

As will be appreciated by those skilled in the art, the FT reactor tube is designed such that reactant carbon monoxide and hydrogen gas may be converted into water and a hydrocarbon. Of course, in order to conduct this reaction, a catalyst may be involved. The present embodiment of FT reactor tube may use any type of catalyst/catalyst structure. However, one particular type of catalyst that has been found to be effective is an FT catalyst that has been dispersed within the tubular structures of the compact tube using technology that provides a micro-fibrous substrate for dispersal of nano-sized FT catalyst. A photomicrograph of a typical micro-fibrous structure is shown in FIG. 5A. The use of this type of substrate could assist in solving many of the traditional problems with a fixed bed FT unit. The micro-fibrous structure breaks up flow and thus promotes a more even distribution of the synthesis gas through the FT synthesis tube. Further, a micro-fibrous structure is believed to provide increased activity by the better utilization of the supported structure. Proper selection of the micro-fibrous structure could also promote heat transfer (i.e., use of a metallic material for the removal of heat from the highly exothermic FT process and conveying it to the walls of the unit). Those skilled in the art will appreciate what materials may be used as the micro-fibrous material. Since excess heat promotes growth of undesirable light gaseous hydrocarbons, removal of heat has limited the use of fixed bed FT units.

Figure 5B:
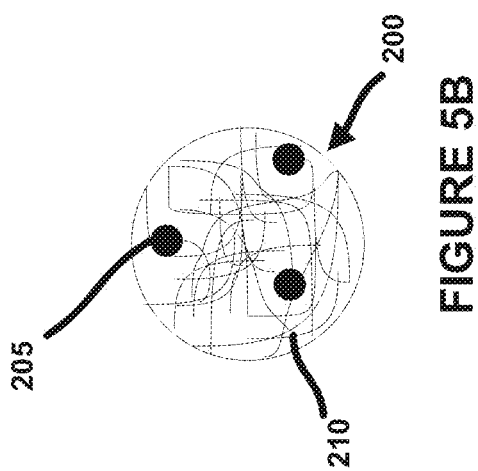
FIG. 5B is a schematic representation of the micro-graph of FIG. 5A.
Figure 5A:
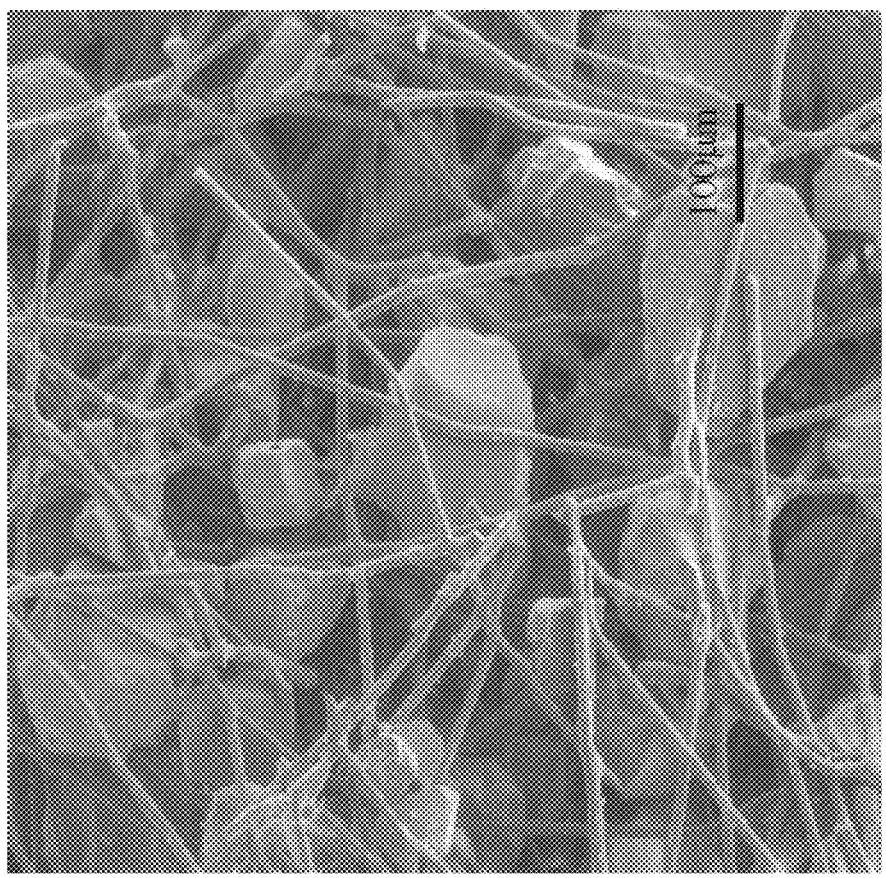
FIG. 5A is a photomicrograph of nano-particles of a catalyst in a micro-fibrous structure.

FIG. 5B is a schematic representation of the photomicrograph of FIG. 5A. As shown in FIG. 5B, the MFEC 200 comprises the metallic catalyst 205 (which is a nano-particle) that is nano-dispersed within a micro-fibrous material 210. As shown in FIG. 5B, the nano-particle catalyst 205 are shown as circles, although those skilled in the art will appreciate that this representation is made for clarity and that other particle shapes may be used. The MFEC 200 (e.g., the nano-dispersed micro-fibrous material 210 and the nano-particle catalyst 205 are packed within the FT reactor tube (not shown in FIGS. 5A and 5B) and the syngas is allowed to pass through the tube, thereby causing an FT reaction to occur. Further, FIG. 5B shows that syngas 220 is added to the reactor tube and, while in the tube, an FT reaction occurs such that a hydrocarbon material 230 is produced.

In many embodiments of the present inventions, supported or unsupported packed bed catalysts may be used. These may include alumina extrudates or silica pellets, self-supported iron and the like embodiments. In other embodiments, micro-fiber catalysts may be used.

Figure 6:
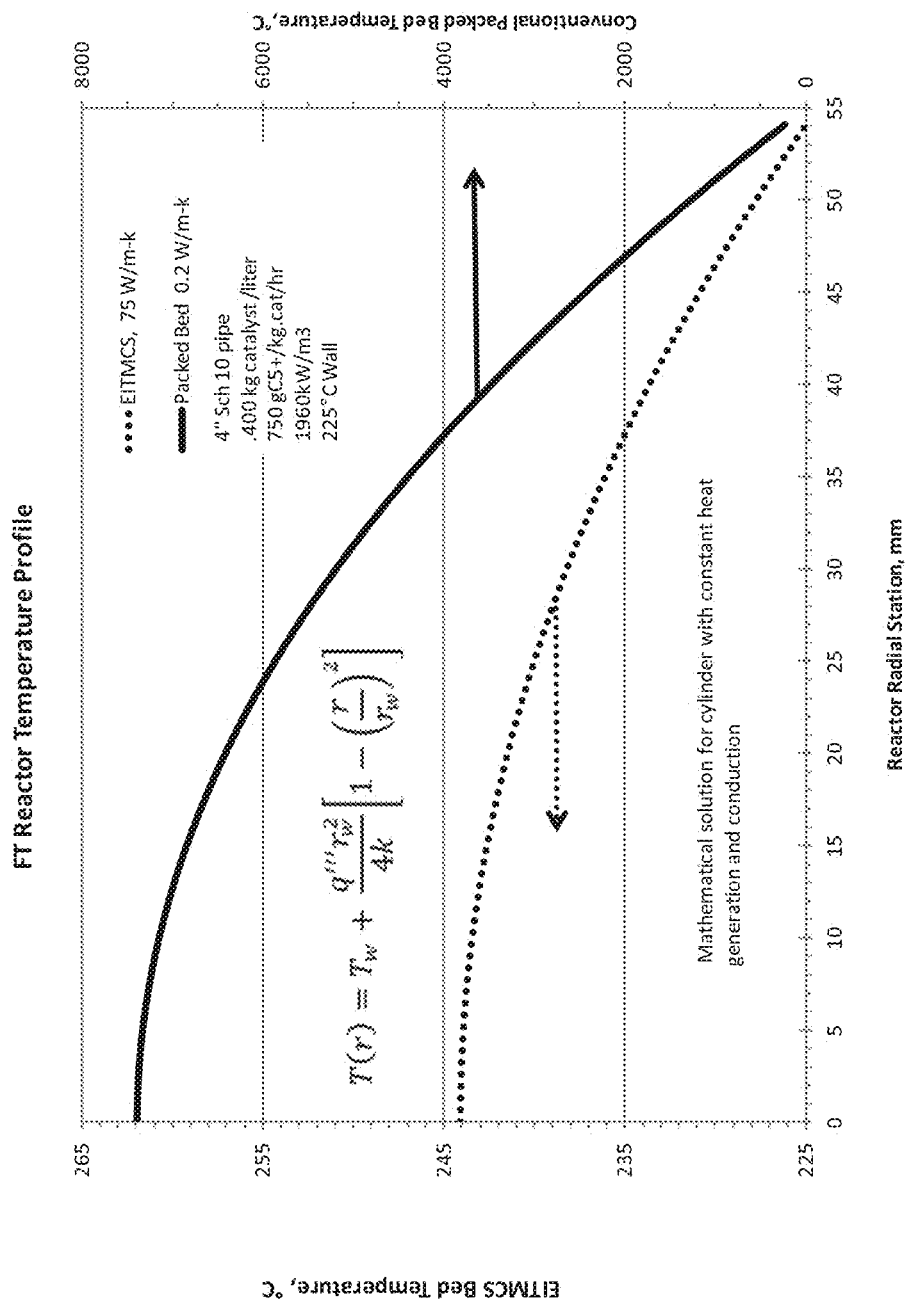
FIG. 6 is a graph showing the temperature profile in a cylinder with constant heat generation.
Figure 7:
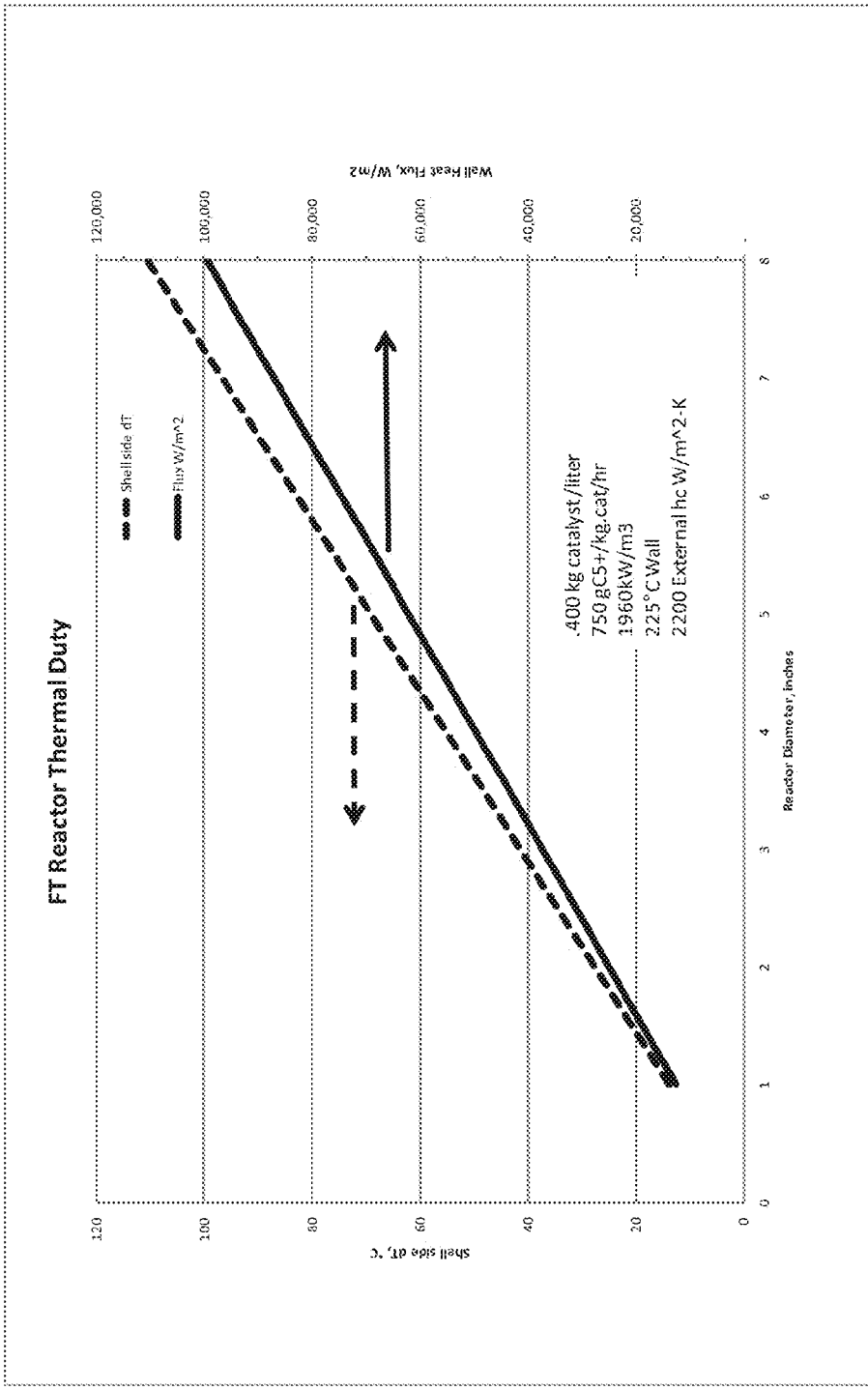
FIG. 7 is a graph of the diameter of the FT tube wall with respect to the desired number of barrels per day of FT product.
Figure 8:
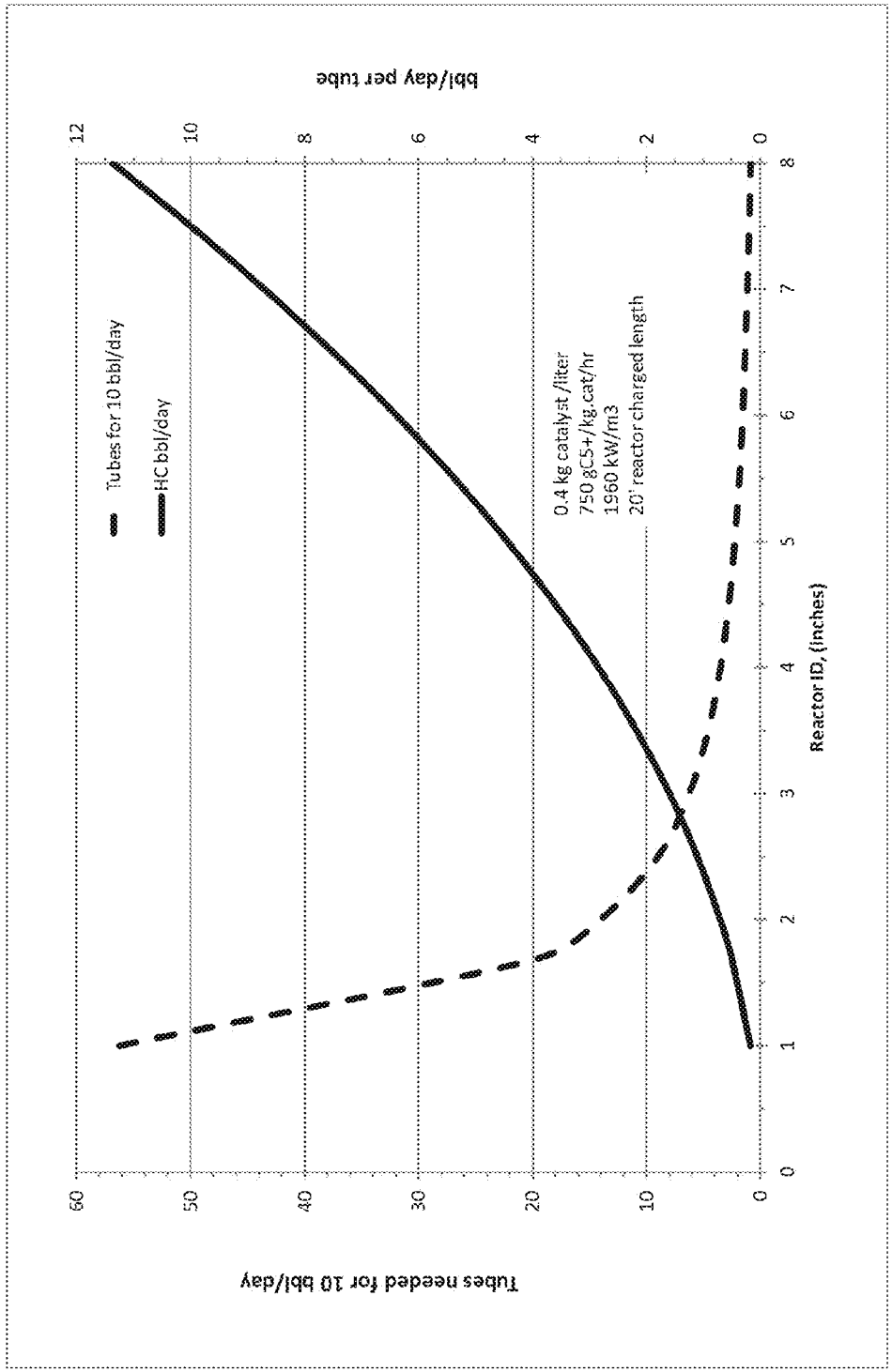
FIG. 8 is a graph of the FT reactor product as a function of the diameter of the FT tube.

The graphs shown in FIGS. 6-8 show the advantage of an enhanced internal thermal management catalyst structures ("EITMCS"), which in certain embodiments can be the insert 100 (see FIG. 1) and the MFEC 200 (see 5b), either alone or in combination. Specifically, these graphs show the advantages of the present embodiments in terms of temperature control, and the potential reactor size and productivity vs. reactor diameter. The graphs are based on reactor data and projected state of the art high activity catalyst.

As shown in FIG. 7, the expression for the temperature profile in a cylinder with constant heat generation is shown. At a given catalyst activity the heat generation rate q''' is fixed. The effective bed conductivity k limits the maximum reactor tube diameter ($2 \cdot r_w$). A high effective bed conductivity allows the use of larger diameter reactors.

The reactors having an enhanced internal thermal management structure can have an effective bed conductivity 50 times that of a conventional extrudate packed bed, allowing 7 times the reactor diameter for the same temperature difference. Alternatively, and/or additionally, embodiments of the present invention incorporating an internal heat transfer fin or insert within the FT tube could also include the cooling block 150 (see FIG. 3) and the MFEC 200 (see FIG. 5b). This type of heat transfer fin/insert is described in U.S. Provisional Patent Application Ser. No. 61/600,501, filed Feb. 17, 2012 (which patent application is expressly incorporated herein by reference), may also be used to increase the effective bed thermal conductivity. In other words, the insert of the above-recited provisional patent application may be placed within the FT tube as a way of further dissipating heat from the interior of the tube. It should also be noted that U.S. Provisional Patent Application Ser. No. 61/601,134 (which patent application is expressly incorporated herein by reference) provides for a primary and secondary cooling mechanism (coolant flow) as an additional means to dissipate heat. In other words, the tubes of the present embodiments may be used in conjunction with the primary/secondary coolant flow mechanism of the above-recited provisional application. Those skilled in the art will appreciate that the embodiments of U.S. Provisional Patent Application Ser. No. 61/601,134 may also be used with the cooling MFEC catalyst structure or the other embodiments described herein.

The reactor tube must be capable of carrying off heat once heat has been conducted to the reactor tube wall. The graph of FIG. 7 shows the tube wall heat flux values vs. reactor size and the coolant ΔT assuming a typical value for a forced convection heat transfer coefficient hc. The present embodiments provide an improved means of supporting high reactor wall heat transfer while maintaining a very uniform temperature along the length of the reactor.

The reactor tube addresses heat removal at the wall, by a novel design with integrated primary and secondary bed temperature control. The graph of FIG. 8 shows the benefits associated with having a larger diameter reactor tube, in order to produce a desired number of bbl (barrels FT product) per day. As shown by the graph of FIG. 8, conventional FT reactors are limited to about 1" diameter for a less active catalyst to ⅝" or smaller diameter for a very active catalyst. However, the MFEC with the present embodiments, along with the heat transfer inserts as described in U.S. Provisional Patent Application Ser. No. 61/600,501 and that primary and secondary bed temperature control designs as described in U.S. Provisional Patent Application Ser. No. 61/601,134 allow the use of reactor tubes of up to 4" with the most active known catalyst or up to 10" with less active catalysts. This reduces the cost and complexity required for a given production rate.

All the patent applications and patents listed herein are expressly incorporated herein by reference.

What is claimed is:

1. A Fischer Tropsch ("FT") unit comprising:
an FT tube;
an insert that is positioned within the FT tube, the insert comprising:
at least one cross-piece that contacts an inner surface of the FT tube; and
wherein each cross-piece comprises a plurality of cross-fins along the cross-piece and extending from the cross-piece, wherein each cross-fin positioned closer to the FT tube is longer than each cross-fin positioned closer to a center of the insert.

2. The FT unit as in claim 1, wherein the insert comprises three cross-pieces, wherein each cross-piece contacts the inner wall of the FT tube, wherein the three cross-pieces generally form a "snowflake" configuration.

3. The FT unit as in claim 2, wherein the end of each cross-piece comprises a pad, wherein each pad contacts the inner surface of the FT tube.

4. The FT unit as in claim 3, wherein there is a corresponding second cross-fin that is positioned adjacent each cross-fin.

5. The FT unit as in claim 4, wherein each cross-fin and each corresponding second cross-fin are disposed towards the inner surface of the FT tube.

6. The FT unit as in claim 5, wherein each cross-piece comprises two cross-fins and two corresponding second cross-fins.

7. The FT unit as in claim 1, further comprising a thermocouple in communication with the insert.

8. The FT unit as in claim 6, wherein a thermocouple opening is positioned at the center of the insert.

9. The FT unit as in claim 1, wherein the insert is made of a heat conductive metal.

10. The FT unit as in claim 9, wherein the insert is made of aluminum.

11. The FT unit as in claim 1, wherein the FT tube has an inner diameter of greater than or equal to about ⅝ of an inch.

12. The FT unit as in claim 1, wherein the FT tube has an inner diameter of less than or equal to about 10 inches.

13. The FT unit as in claim 1, wherein the FT tube has an inner diameter of between about 1 inch and about 10 inches.

14. The FT unit as in claim 1, further comprising a heat removal media in communication with an outer surface of the FT tube.

15. The FT unit as in claim 14, wherein the heat removal media comprises a cooling fluid.

16. The FT unit as in claim 15, wherein the cooling fluid comprises one of water or oil.

17. The FT unit as in claim 14, wherein the heat removal media comprises a cooling block.

18. The FT unit as in claim 17, wherein the cooling block comprises cooling channels for receiving a cooling fluid.

19. The FT unit as in claim 1, further comprising means for controlling the temperature of the FT unit.

20. The FT unit as in claim 1, wherein the FT unit is configured to operate at a temperature T(r) between about 210° C. and about 235° C. where
$T(r) = T_w + [q''' r_w^2 / 4k][1 - (r/r_w)^2]$, and where $T_w$ is the temperature at a wall of the FT tube, q''' is the heat generation rate for a given catalyst activity, $r_w$ is the FT tube radius, k is the effective bed conductivity, and r is the radius within the tube at which the temperature of the FT unit is measured.

21. The FT unit as in claim 1, wherein the temperature difference between a operational temperature at a wall of the FT tube and the approximate center of the FT tube is less than about 25° C.

22. An insert that is designed to be positioned within an Fischer Tropsch ("FT") reactor tube, the insert comprising:
- three cross-pieces arranged to have dihedral symmetry;
- a plurality of cross-fins along each cross-piece and extending from the cross-piece, wherein each cross-fin positioned closer to the FT tube is longer than each cross-fin positioned closer to a center to the insert, wherein each cross-fin extends radially outwardly from the cross-piece such that the edge of the cross-fin is closer to the inner surface of the FT reactor tube than the base of the cross-fin.

* * * * *